United States Patent [19]  [11]  4,330,663
Rosenquist  [45]  May 18, 1982

[54] BENZOATE ESTER TERMINATED POLYESTER-CARBONATE

[75] Inventor: Niles R. Rosenquist, Evansville, Ind.

[73] Assignee: General Electric Company, Mt. Vernon, Ind.

[21] Appl. No.: 221,663

[22] Filed: Dec. 31, 1980

[51] Int. Cl.³ .............................................. C08G 63/64
[52] U.S. Cl. .................................... 528/176; 528/128; 528/173; 528/194
[58] Field of Search ............... 528/176, 194, 128, 173

[56] References Cited

U.S. PATENT DOCUMENTS

| | | | |
|---|---|---|---|
| 4,238,597 | 12/1980 | Markezich et al. | 528/176 X |
| 4,255,556 | 3/1981 | Segal et al. | 528/173 X |
| 4,260,719 | 4/1981 | Ching | 528/191 X |
| 4,260,731 | 4/1981 | Mori et al. | 528/173 |
| 4,269,964 | 5/1981 | Freitag et al. | 528/128 X |

*Primary Examiner*—Lucille M. Phynes
*Attorney, Agent, or Firm*—Martin B. Barancik; William F. Mufatti

[57] ABSTRACT

A polyester-carbonate polymer containing benzoate or substituted benzoate ester terminal groups.

21 Claims, No Drawings

BENZOATE ESTER TERMINATED POLYESTER-CARBONATE

This invention is directed to aromatic polyester-carbonate polymers of controlled molecular weight wherein the polymers contain benzoate ester or substituted benzoate ester terminal groups.

BACKGROUND OF THE INVENTION

It is known that in certain procedures of producing aromatic polyester-carbonates small amounts of certain molecular weight regulators or chain terminators can be used to provide end or terminal groups on the polyester-carbonate and thereby control the molecular weight of the polymer. Such materials include chroman, phenol and p-tertiary-butylphenol.

The prior art also discloses several other types of compounds that act as chain terminators for polycarbonates. Thus, U.S. Pat. No. 3,085,992 discloses alkanol amines as chain terminators; U.S. Pat. No. 3,399,172 teaches imides as chain terminators; U.S. Pat. No. 3,275,601 discloses that aniline and methyl aniline function as chain terminators in the interfacial polymerization process for producing polycarbonates; and U.S. Pat. No. 4,001,184 discloses primary and secondary amines as molecular weight regulators for polycarbonate. Furthermore, U.S. Pat. No. 3,028,365 discloses that aromatic amines and other monofunctional compounds can be used to control or regulate the molecular weight of the polycarbonate, thereby forming aryl carbamate terminal groups. Aromatic polycarbonates having carbamate end groups are disclosed in U.S. Pat. No. 4,111,910. These polycarbonates are prepared using a terminating amount of ammonia, ammonium compounds, primary cycloalkyl, aliphatic or aralkyl amines and secondary cycloalkyl, alkyl or aralkyl amines, and chroman-I.

However, according to Schnell, *Chemistry and Physics of Polycarbonates* (1964), page 183, ammonium hydroxide and amines saponify polycarbonates back to the monomers, i.e., bisphenol A. This is supported by Bolgiano in U.S. Pat. No. 3,223,678 wherein he indicates that small amounts of amines such as monoethanolamine and morpholine break or degrade the polycarbonates into lower molecular weight polycarbonates. Thus, this area of chain terminators for polycarbonates is generally not very well understood and is one where the empirical approach is still generally the rule in determining whether a particular compound or class of compounds will function as effective chain terminators in polycarbonates.

The same uncertainty which is present in the case of polycarbonate resins also holds true for polyester-carbonate resins. This area is further complicated by the fact that not only must a particular compound act as a chain terminator, but this compound when incorporated into the polyester-carbonate polymer as a terminal group must not adversely affect the physical properties of the polyester-carbonate. Thus, while some compounds may be effective chain terminators they are not practical since when they are incorporated into the polymer as terminal groups they adversely affect the physical properties of the polyester-carbonate.

DESCRIPTION OF THE INVENTION

The instant invention is directed to novel high molecular weight aromatic polyester-carbonate polymers having as terminal groups particular benzoate esters. The termination of the polyester-carbonate polymer chain with these groups results in a polyester-carbonate having controlled molecular weight, all of the advantageous properties of polyester-carbonate resins, and a high heat distortion temperature.

The polyester-carbonates which find use in the instant invention and the methods for their preparation are well known in the art as disclosed in U.S. Pat. Nos. 3,303,331; 3,169,121; 4,194,038 and 4,156,069, as well as in copending application Ser. No. 33,389 filed Apr. 26, 1979 and assigned to the same assignee as the instant application, all of which are incorporated herein by reference.

The polyester-carbonates can generally be termed copolyesters containing carbonate groups, carboxylate groups, and aromatic carbocyclic groups in the polymer chain, in which at least some of the carboxylate groups and at least some of the carbonate groups are bonded directly to ring carbon atoms of the aromatic carbocyclic groups. These polyester-carbonates are, in general, prepared by reacting a difunctional carboxylic acid or a reactive derivative of the acids such as the acid dihalide, a dihydric phenol and a carbonate precursor.

The dihydric phenols useful in formulating the polyester-carbonates which are of use in the practice of the present invention are in general represented by the general formula

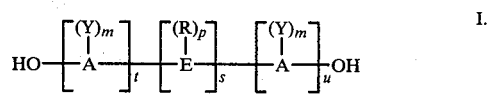

I.

wherein A represents an aromatic group such as phenylene, biphenylene, naphthylene, etc. E may be an alkylene or alkylidene group such as methylene, ethylene, propylene, propylidene, isopropylidene, butylene, butylidene, isobutylidene, amylene, isoamylene, amylidene, isoamylidene, etc. Where E is an alkylene or alkylidene group, it may also consist of two or more alkylene or alkylidene groups connected by a non-alkylene or non-alkylidene group such as an aromatic linkage, a tertiary amino linkage, an ether linkage, a carbonyl linkage, a silicon-containing linkage, or by a sulfur-containing linkage such as sulfide, sulfoxide, sulfone, etc. In addition, E may be a cycloaliphatic group (e.g. cyclopentyl, cyclohexyl, etc.); a sulfur-containing linkage, such as sulfide, sulfoxide or sulfone; an ether linkage; a carbonyl group; a tertiary nitrogen group; or a silicon-containing linkage such as silane or siloxy. Other groups which E may represent will occur to those skilled in the art. R represents hydrogen or a monovalent hydrocarbon group such as alkyl (methyl, ethyl, propyl, etc.), aryl (phenyl, naphthyl, etc.), aralkyl (benzyl, ethylphenyl, etc.), or cycloaliphatic (cyclopentyl, cyclohexyl, etc.). Y may be an inorganic atom such as a halogen (fluorine, bromine, chlorine, iodine), an inorganic group such as the nitro group, an organic group such as R above, or an oxy group such as OR, it being only necessary that Y be inert to and unaffected by the reactants and the reaction conditions. The letter m represents any integer from and including zero through the number of positions on A available for substitution; p represents an integer from and including zero throught the number of positions on E available for substitution; t represents an integer equal to at least one;

s is either zero or one; and u represents an integer including zero.

In the dihydric phenol compound represented by Formula I above, when more than one Y substituent is present, they may be the same or different. The same holds true for the R substituent. Where s is zero in Formula I and u is not zero, the aromatic rings are directly joined with no intervening alkylene or other bridge. The positions of the hydroxyl groups and Y on the aromatic nuclear residues A can be varied in the ortho, meta, or para positions and the groupings can be in a vicinal, asymmetrical or symmetrical relationship, where two or more ring carbon atoms of the hydrocarbon residue are substituted with Y and hydroxyl groups.

Some nonlimiting examples of dihydric phenol compounds falling within the scope of Formula I which can be used in the preparation of the polyester-carbonates useful in the practice of the present invention include:
2,2-bis-(4-hydroxyphenyl)-propane (bisphenol A);
2,4'-dihydroxydiphenylmethane;
bis-(2-hydroxyphenyl)-methane;
bis-(4-hydroxyphenyl)-methane;
bis-(4-hydroxy-5-nitrophenyl)-methane;
bis-(4-hydroxy-2,6-dimethyl-3-methoxyphenyl)-methane;
1,1-bis-(4-hydroxyphenyl)-ethane;
1,1-bis-(4-hydroxy-2-chlorophenyl)-ethane;
2,2-bis-(3-phenyl-4-hydroxyphenyl)-propane;
bis-(4-hydroxyphenyl)-cyclohexylmethane; and
2,2-bis-(4-hydroxyphenyl)-1-phenylpropane.

These dihydric phenols may be used alone or as mixtures of two or more different dihydric phenols.

In general, any difunctional carboxylic acid, or its reactive derivative such as the acid dihalide, conventionally used in the preparation of polyesters may be used for the preparation of the polyester-carbonates useful in formulating the novel end capped polyester-carbonates of the instant invention. In general, the carboxylic acids which may be used are aliphatic carboxylic acids, aliphatic-aromatic carboxylic acids, or aromatic carboxylic acids. The aromatic dicarboxylic acids or their reactive derivatives such as the aromatic acid dihalides are preferred as they produce the aromatic polyester-carbonates which are most useful in the practice of the instant invention.

These carboxylic acids may be represented by the general formula

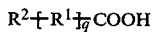

$$R^2 \!\!-\!\! (R^1)_q \!\!-\!\! COOH \qquad \text{II.}$$

wherein $R^1$ represents an alkylene, alkylidene or cycloaliphatic group in the same manner as set out above for E in Formula I; an alkylene, alkylidene or cycloaliphatic group containing ethylenic unsaturation; an aromatic radical such as phenylene, naphthylene, biphenylene, substituted phenylene, etc.; two or more aromatic groups connected through non-aromatic linkages such as those defined by E in Formula I; or an aralkyl radical such as tolylene, xylene, etc. $R^2$ is either a carboxyl or a hydroxyl group. The letter q represents one where $R^2$ is a hydroxyl group and either zero or one where $R^2$ is a carboxyl group. Thus the difunctional acid will either be a monohydroxy monocarboxylic acid or a dicarboxylic acid. For purposes of the present invention the dicarboxylic acids or their reactive derivatives such as the acid dihalides are preferred.

As mentioned previously the aromatic dicarboxylic acids are preferred. Thus in these preferred acids $R^2$ is a carboxyl group and $R^1$ is an aromatic radical such as phenylene, naphthylene, biphenylene, substituted phenylene, etc.; two or more aromatic groups connected through non-aromatic linkages; or an aralkyl radical. Some nonlimiting examples of suitable preferred aromatic and aliphatic-aromatic dicarboxylic acids which may be used in preparing the polyester-carbonates useful in the practice of the present invention include phthalic acid, isophthalic acid, terephthalic acid, homophthalic acid, o-, m-, and p-phenylenediacetic acid; the polynuclear aromatic acids such as diphenic acid, and 1,4-naphthalic acid.

These acids may be used either alone or as mixtures of two or more different acids.

The carbonate precursor may be either a carbonyl halide, a carbonate ester or a haloformate. The carbonyl halides which can be employed herein are carbonyl chloride, carbonyl bromide and mixtures thereof. Typical of the carbonate esters which may be employed herein are diphenyl carbonate, di-(halophenyl) carbonates such as di-(chlorophenyl)carbonate, di-(bromophenyl)carbonate, di-(trichlorophenyl)carbonate, di-(tribromophenyl)carbonate, etc., di-(alkylphenyl)carbonates such as di-(tolyl)carbonate, etc., di-(naphthyl)carbonate, di-(chloronaphthyl)carbonate, phenyl tolyl carbonate, chlorophenyl chloronaphthyl carbonate, etc., or mixtures thereof. The haloformates suitable for use herein include bishaloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene, is preferred.

The polyester-carbonates which are useful in the practice of the present invention are the aromatic polyester-carbonates derived from dihydric phenols, aromatic dicarboxylic acids or their reactive derivatives such as the aromatic acid dihalides, e.g., dichlorides, and phosgene. A quite useful class of aromatic polyester-carbonates are those derived from bisphenol A, aromatic dicarboxylic acids or their reactive derivatives such as terephthalic or isophthalic acid or terephthaloyl or isophthaloyl dichloride, and phosgene. A particularly useful aromatic polyester-carbonate polymer containing benzoate terminal groups, from the standpoint of physical properties, is one derived from bisphenol A, a mixture of isophthalic acid and terephthalic acid or isophthaloyl dichloride and terephthaloyl dichloride in a weight ratio of from 5:95 to 95:5, and phosgene.

The instant invention is directed to novel polyester-carbonate polymers having as terminal or end groups particular benzoate esters. These benzoate ester end groups are formed by the reaction between the polyester-carbonate terminal phenolic oxygen and a radical represented by the general formula

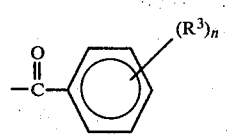

III.

wherein n is an integer having a value from and including 0 up to and including the number of replaceable hydrogen atoms present on the aromatic ring, i.e., 0 to 5 inclusive; and each $R^3$, if present, is independently selected from the group consisting of alkyl radicals of from 1 to about 12 carbon atoms, aryl radicals of from 6 to 18 carbon atoms, alkaryl radicals of from 7 to 18 carbon atoms, aralkyl radicals of from 7 to 18 carbon atoms, alkoxy radicals of from 1 to about 12 carbon atoms, aryloxy radicals of from 6 to 18 carbon atoms, halogen, —NO$_2$ radical,

radicals wherein R$^4$ is selected from hydrogen, alkyl radicals of from 1 to about 8 carbon atoms and acyl radicals and R$^5$ is an acyl radical, and the —C≡N radical.

These radicals of Formula III are obtained from compounds represented by the general formula

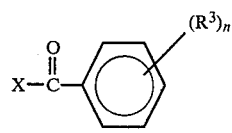

IV.

wherein R$^3$ and n are as defined heretofore and X represents a halide, preferably a chloride, radical or a hydroxyl radical.

The novel polyester-carbonates of the instant invention are prepared by reacting at least one compound of Formula IV with a polyester-carbonate polymer. While not wishing to be bound by any theory it is believed that during the polymerization reaction the compounds of Formula IV react with the terminal dihydric phenol, more specifically the phenolic hydroxyl group, to form the benzoate ester terminal groups present in the polymer thereby terminating the chain growth.

Some nonlimiting illustrative examples of compounds falling within the scope of formula IV are set forth in Table I.

TABLE I

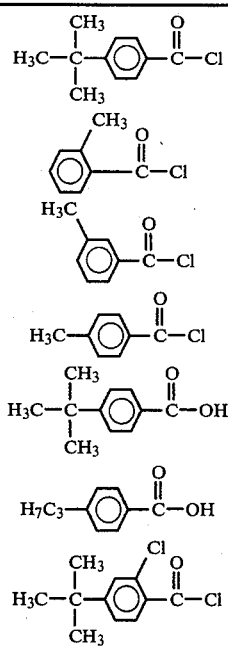

TABLE I-continued

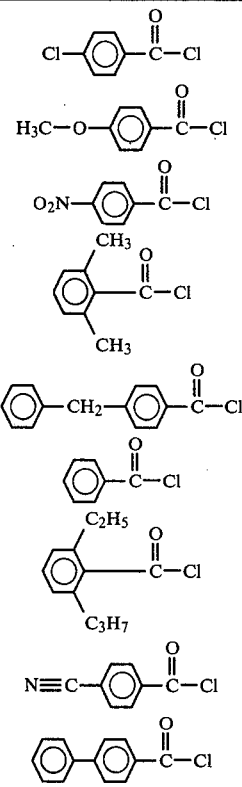

The novel feature of the instant invention is that the compounds of Formula IV react with the polyester-carbonate polymer to provide a polyester-carbonate having controlled molecular weight, improved heat distortion, and all of the other valuable physical properties of polyester-carbonate resins. The weight average molecular weight, for example, can be controlled between about 1,000 and 200,000 depending upon the amount of the compound of Formula IV employed. Preferably, the weight average molecular weight is controlled between about 10,000 and 100,000. Generally, the greater the amount of the compound of Formula IV employed the lower the molecular weight of the polyester-carbonate polymer. Conversely, the smaller the amount of the compound of Formula IV employed the larger the molecular weight of the polyester-carbonate polymer. The amount of the compound of Formula IV employed is a terminating amount. By terminating amount is meant an amount effective to terminate the chain length of the polyester-carbonate polymer before the molecular weight of the polymer becomes too high and, consequently, the polymer becomes too viscous for any practical application but insufficient to terminate the polymer chain before a polyester-carbonate of useful molecular weight is formed. Generally, this amount ranges from between about 0.1 to about 10 mole percent based on the amount of the dihydric phenol present, preferably from about 1 to about 7 mole percent.

In carrying out the present invention only one compound of Formula IV may be used, in which case all of the end groups on the polymers will be the same, or two or more different compounds of Formula IV may be used, in which instance the polymers will contain a mixture of different terminal groups. Additionally, the compounds of Formula IV may be used in conjunction with known phenol and tertiary butyl phenol chain terminators. In such instances the polymers will contain a mixture of end groups formed by the reaction of the various end capping agents with the polymer. The amount of the particular end capping agent used is determinative of the ratio of the resultant end groups present in the polymer.

One of the methods for preparing the polyester-carbonates of this invention, when employing phosgene, involves first introducing diacid chlorides, dissolved in a suitable solvent, into a reaction mixture containing a dihydric phenol, an acid acceptor, a catalyst, and at least one compound of Formula IV. Upon completion of the introduction of the diacid chlorides, phosgene is introduced into the reaction mixture in sufficient quantity to bring about reaction of substantially all of the remaining aromatic hydroxy groups. The compound of Formula IV may be present in the reaction mixture before the introduction of the diacid chlorides has begun; it may be added to the reaction mixture after the diacid chlorides have been added; or addition of the diacid chlorides and at least one compound of Formula IV into the reaction mixture may take place simultaneously. A particularly useful method, and one which results in polyester-carbonate resins of generally uniform molecular weight, involves mixing the compound or compounds of Formula IV with the dicarboxylic acid or reactive derivative thereof such as the diacid chloride and gradually adding this mixture to the reaction mixture before the introduction of phosgene has commenced.

A suitable acid acceptor may be either organic or inorganic in nature. A suitable organic acid acceptor is a tertiary amine and includes such materials as pyridine, triethylamine, dimethylaniline, tributylamine, etc. The inorganic acid acceptor may be one which can be either a hydroxide, a carbonate, a bicarbonate, a phosphate, or alkaline or alkali earth metal hydroxide.

The catalysts present in the reaction mixture may be any of the suitable catalysts that aid the polymerization reaction between the dihydric phenol, phosgene and the dicarboxylic acid or its reactive derivative. Suitable catalysts include, but are not limited to, tertiary amines, secondary amines, quaternary ammonium compounds, quaternary phosphonium compounds, and amidines.

The temperature at which the reaction proceeds may vary from below 0° C. to above 100° C. The reaction proceeds satisfactorily at temperatures from room temperature (25° C.) to 50° C. Since the reaction is exothermic, the rate of dicarboxylic acid, or a reactive derivative thereof such as the diacid chloride, or phosgene addition may be used to control the reaction temperature.

The polyester-carbonate resins of the instant invention may optionally have admixed therewith the commonly known and used additives such as antioxidants, antistatic agents, mold release agents, colorants, impact modifiers, ultraviolet light absorbers, plasticizers, fillers, glass fibers, color stabilizers, hydrolytic stabilizers, and flame retardants such as, for example, those described in U.S. Pat. Nos. 3,915,926 and 4,197,232, the disclosures of which are incorporated herein by reference.

DESCRIPTION OF THE PREFERRED EMBODIMENT

The following examples are set forth to further illustrate the present invention and are not to be construed as limiting the invention thereto. Unless otherwise specified, where parts or percents are mentioned, they are parts or percents by weight.

EXAMPLE 1

This example illustrates a polyester-carbonate end capped with a prior art end capping agent and thus falling outside the scope of the instant invention.

To a reactor fitted with a mechanical agitator are charged 6 liters of deionized water, 10 liters of methylene chloride, 1910 grams (8.36 moles) of bisphenol A, 24 milliliters of triethylamine, 3.4 grams of sodium gluconate and 65 grams (0.43 mole) of p-tertiary butyl phenol. This reaction mixture is stirred and to the stirred mixture are added, over a 15 minute period, a mixture of 890 grams of terephthaloyl dichloride and 160 grams of isophthaloyl dichloride as a 25 weight % solids solution in methylene chloride. During the acid chloride addition the pH is maintained in the range of 8.5 to 11.5 by the addition of 25% aqueous sodium hydroxide. The resulting reaction mixture is then phosgenated by the introduction of phosgene at the rate of 36 grams/minute for 15 minutes with the pH controlled at 9.5 to 12 by the addition of the aqueous sodium hydroxide. After phosgenation is terminated 6 liters of methylene chloride are added, the brine layer is separated by centrifuge and the resin solution is washed with aqueous acid and with water. The resin is steam precipitated and dried in a nitrogen fluid bed at approximately 240° F. To this resin product are added minor amounts (about 0.1 part by weight per hundred parts by weight of resin) of a phosphite color stabilizer and an epoxy stabilizer. This stabilized resin product is then fed to an extruder operating at a temperature of about 600° F. to extrude the resin into strands and the extruded strands are chopped into pellets. The pellets are then injection molded at about 650° F. into test samples measuring about $2.5'' \times \frac{1}{2}'' \times \frac{1}{8}''$.

EXAMPLE 2

This example illustrates a polyester-carbonate end capped with a compound of the present invention.

To a reactor fitted with a mechanical agitator are charged 6 liters of deionized water, 10 liters of methylene chloride, 1910 grams (8.36 moles) of bisphenol A, 24 milliliters of triethylamine, and 3.4 grams of sodium gluconate. This mixture is stirred and to the stirred mixture are added, over a 15 minute period, a mixture of 890 grams of terephthaloyl dichloride, 160 grams of isophthaloyl dichloride and 85.2 grams (0.43 mole) of p-tertiary butyl benzoyl chloride as a 26 weight % solids solution in methylene chloride. During the addition of the acid chloride mixture the pH is maintained in the range of 8.5 to 11.5 by the addition of 25% aqueous sodium hydroxide. The resulting reaction mixture is then phosgenated by the introduction of phosgene at the rate of 36 grams/minute for 15 minutes with the pH controlled at 9.5 to 12 by the addition of the aqueous sodium hydroxide. After phosgenation is terminated 6 liters of methylene chloride are added, the brine layer is separated by centrifuge and the resin solution is washed with aqueous acid and with water. The resin is steam precipitated and dried in a nitrogen fluid bed drier at approximately 240° F. To this resin product are added minor amounts (about 0.1 part by weight per hundred parts by weight of resin) of a phosphite color stabilizer and an epoxy stabilizer. This stabilized resin product is then fed to an extruder operating at a temperature of about 600° F. to extrude the resin into strands and the extruded strands are chopped into pellets. The pellets are then injection molded at about 650° F. into test samples measuring about 2.5"×½"×⅛".

Various physical properties of the resin and the molded samples obtained in Examples 1 and 2 were determined according to the following test procedures:

Heat Distortion Temperature Under Load (DTUL) of the molded samples was determined according to ASTM D-648;

Notched Izod (NI) impact on the molded samples were determined according to ASTM D-256;

The Intrinsic Viscosity was determined in methylene chloride at 25° C.;

Melt Index (MI) was determined according to modified ASTM D-1238.

The results of these tests are set forth in Table II.

As clearly shown by the data in Table II the aromatic polyester-carbonates having as terminal groups the particular radicals of Formula III of the present invention have a higher heat distortion temperature than the prior art aromatic polyester-carbonates (Example 1) while having a controlled molecular weight quite close to that of the prior art resins end capped with t-butyl phenol.

This higher heat distortion temperature is of considerable importance. One of the main arguments for using polyester-carbonates in place of polycarbonate resins in certain applications is that the polyester-carbonate resins have a higher heat distortion temperature under load (generally from about 50° F. to about 60° F. higher) than polycarbonate resins. Thus, in applications requiring a material having a high heat distortion temperature the polyester-carbonates are usually preferred over polycarbonate resins, even though the processability of these polyester-carbonates is inferior to that of the polycarbonate resins.

TABLE II

| EXAMPLE NO. | MELT INDEX | INTRINSIC VISCOSITY | DTUL (at 264 psi, °F.) | NI (ft. lb./in.) |
|---|---|---|---|---|
| 1 | 0.77 | 0.502 | 322.7 | 7.4 |
| 2 | 0.61 | 0.506 | 327.9 | 6.7 |

In the preparation of polycarbonates the usual end capping agent employed is phenol. This is generally due to the fact that phenol is readily available, is relatively inexpensive, and results in a polycarbonate resin having adequate properties for most commercial and industrial applications. The standard end capping agent used in the preparation of polyester-carbonate resins is t-butyl phenol. This is due to the fact that polyester-carbonate resins wherein t-butyl phenol is utilized as the chain terminator have a 4° F. to 6° F. higher heat distortion temperature than polyester-carbonate resins wherein phenol is used as the chain terminator. Thus, it can be readily appreciated that any further improvement in the heat distortion temperature of polyester-carbonates, especially if it can be obtained without impairment of any of the other advantageous physical properties of the resin, is of great advantage and a major improvement in the resin.

It will thus be seen that the objects set forth above among those made apparent from the preceding description, are efficiently attained, and since certain changes may be made in carrying out the above process and the compositions set forth without departing from the scope of the invention, it is intended that all matters contained in the above description shall be interpreted as illustrative and not in a limiting sense.

We claim:

1. An aromatic polyester-carbonate polymer containing as terminal groups benzoyl radicals represented by the formula

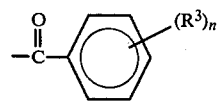

wherein n is an integer having a value from 0 to 5 inclusive; and each $R^3$ is independently selected from the group consisting of alkyl radicals, aryl radical, alkaryl radical, aralkyl radicals, alkoxy radicals, aryloxy radicals, halides, $-NO_2$,

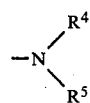

radicals wherein $R^4$ is selected from hydrogen, alkyl radicals and acyl radicals and $R^5$ is an acyl radical, and $-C\equiv N$.

2. The aromatic polyester-carbonate polymer of claim 1 wherein said benzoyl radicals are derived from compounds represented by the formula

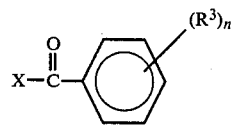

wherein X is halogen or hydroxyl.

3. The aromatic polyester-carbonate polymer of claim 1 wherein said polymer has a weight average molecular weight in the range of from 1,000 to 200,000.

4. The aromatic polyester-carbonate polymer of claim 3 wherein said polymer has a weight average molecular weight in the range of from about 10,000 to about 100,000.

5. The aromatic polyester-carbonate polymer of claim 1 wherein each $R^3$ is independently selected from alkyl radicals.

6. The aromatic polyester-carbonate polymer of claim 5 wherein said alkyl radicals are branched alkyl radicals.

7. The aromatic polyester-carbonate polymer of claim 6 wherein said branched alkyl radical is the t-butyl radical.

8. The aromatic polyester-carbonate polymer of claim 2 wherein X is chloride.

9. The aromatic polyester-carbonate polymer of claim 1 wherein said polymer is derived from phosgene, a dihydric phenol, and at least one aromatic dicarboxylic acid or a reactive derivative thereof.

10. The aromatic polyester-carbonate polymer of claim 9 wherein said reactive derivative is selected from the group consisting of terephthaloyl dichloride, isophthaloyl dichloride, and mixtures thereof.

11. The aromatic polyester-carbonate polymer of claim 10 wherein said reactive derivative comprises a 5:95 to 95:5 by weight mixture of isophthaloyl dichloride and terephthaloyl dichloride.

12. The aromatic polyester-carbonate polymer of claim 11 wherein said dihydric phenol is bisphenol A.

13. An aromatic polyester-carbonate containing as terminal groups at least one benzoate ester group prepared by the process of reacting a dihydric phenol, a carbonate precursor, and at least one aromatic dicarboxylic acid or a reactive derivative thereof in the presence of a terminating amount of at least one compound represented by the formula

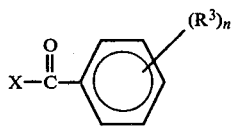

wherein n is an integer having a value from 0 to 5 inclusive; X is halogen or hydroxyl; and each $R^3$ is independently selected from the group consisting of alkyl radicals, aryl radicals, alkaryl radicals, aralkyl radicals, alkoxy radical, aryloxy radicals, halides, $-NO_2$,

radicals wherein $R^4$ is selected from hydrogen, alkyl radicals and acyl radicals and $R^5$ is an acyl radical, and $-C\equiv N$.

14. The aromatic polyester-carbonate of claim 13 wherein said dihydric phenol is bisphenol A.

15. The aromatic polyester-carbonate of claim 14 wherein said carbonate precursor is phosgene.

16. The aromatic polyester-carbonate of claim 15 wherein said reactive derivative of said aromatic dicarboxylic acid is selected from the group consisting of terephthaloyl dichloride, isophthaloyl dichloride, and mixtures thereof.

17. The aromatic polyester-carbonate of claim 16 wherein X is chloride.

18. The aromatic polyester-carbonate of claim 17 wherein each $R^3$ is independently selected from alkyl radicals.

19. The aromatic polyester-carbonate of claim 18 wherein said alkyl radicals are branched alkyl radicals.

20. The aromatic polyester-carbonate of claim 19 wherein said branched alkyl radical is the t-butyl radical.

21. The aromatic polyester-carbonate of claim 13 wherein said terminating amount is from about 0.1 to about 10 mole percent based on the weight of the dihydric phenol.

* * * * *